United States Patent
Gysling et al.

(10) Patent No.: US 9,057,635 B2
(45) Date of Patent: Jun. 16, 2015

(54) VELOCITY BASED METHOD FOR DETERMINING AIR-FUEL RATIO OF A FLUID FLOW

(75) Inventors: Daniel L. Gysling, Glastonbury, CT (US); Douglas H. Loose, Southington, CT (US)

(73) Assignee: CiDRA CORPORATE SERVICES INC.

( * ) Notice: Subject to any disclaimer, the term of this patent is extended or adjusted under 35 U.S.C. 154(b) by 1261 days.

(21) Appl. No.: 12/874,728

(22) Filed: Sep. 2, 2010

(65) Prior Publication Data

US 2010/0332154 A1  Dec. 30, 2010

Related U.S. Application Data

(63) Continuation of application No. 12/179,214, filed on Jul. 24, 2008, now Pat. No. 7,810,400.

(60) Provisional application No. 60/961,721, filed on Jul. 24, 2007, provisional application No. 61/027,500, filed on Feb. 11, 2008, provisional application No. 61/034,602, filed on Mar. 7, 2008.

(51) Int. Cl.
   *G01F 1/34* (2006.01)
   *G01F 1/74* (2006.01)
   *G01F 1/66* (2006.01)
   *G01F 1/708* (2006.01)

(52) U.S. Cl.
   CPC .. *G01F 1/74* (2013.01); *G01F 1/34* (2013.01); *G01F 1/666* (2013.01); *G01F 1/7082* (2013.01)

(58) Field of Classification Search
   CPC ......... G01F 1/34; G01F 1/666; G01F 1/7082; G01F 1/74; G01F 1/86; G01F 1/88
   USPC ......... 702/45, 47, 48; 700/274; 110/185, 186, 110/188, 189; 73/861.42, 861.49
   See application file for complete search history.

(56) References Cited

U.S. PATENT DOCUMENTS

| | | | |
|---|---|---|---|
| 5,048,761 A * | 9/1991 | Kim | 241/19 |
| 5,908,990 A | 6/1999 | Cummings | |
| 6,148,744 A | 11/2000 | Chapman et al. | |
| 6,202,575 B1 | 3/2001 | Bauver, II et al. | |
| 6,502,467 B1 | 1/2003 | Fincke | |

(Continued)

FOREIGN PATENT DOCUMENTS

WO   2008133051   11/2008

OTHER PUBLICATIONS

Sanderson et al. "Guidelines for the Use of Ultrasonic Non-Invasive Metering Techniques," Flow Measurement and Instrumentation, Jul. 17, 2002, pp. 124-142.

(Continued)

*Primary Examiner* — Manuel L Barbee

(57) ABSTRACT

A method for determining one or more fluid flow parameters for a fluid flowing within a pipe is provided. The fluid is a mixture of solid particles and gas. The method includes the steps of: a) providing a meter operable to determine the velocity of the fluid flow through the pipe, which meter is substantially insensitive to the particulate/gas mass ratio of the fluid flow; b) determining the velocity of the fluid flow within the pipe using the meter; and c) determining a particulate/gas mass ratio using a density value for the gas within the flow and the determined fluid flow velocity.

15 Claims, 7 Drawing Sheets

(56) References Cited

U.S. PATENT DOCUMENTS

| | | |
|---|---|---|
| 6,546,811 B2 | 4/2003 | Fincke |
| 6,609,069 B2 | 8/2003 | Gysling |
| 6,889,562 B2 | 5/2005 | Gysling et al. |
| 7,275,421 B2 | 10/2007 | Gysling et al. |
| 7,295,933 B2 | 11/2007 | Gysling et al. |
| 7,322,245 B2 | 1/2008 | Gysling et al. |
| 7,330,797 B2 | 2/2008 | Bailey et al. |
| 7,359,803 B2 | 4/2008 | Gysling et al. |
| 7,430,924 B2 | 10/2008 | Gysling et al. |
| 2003/0154036 A1* | 8/2003 | Gysling et al. .......... 702/25 |
| 2004/0221777 A1 | 11/2004 | Hart et al. |
| 2006/0115779 A1 | 6/2006 | Yamamoto et al. |
| 2007/0006744 A1 | 1/2007 | Gysling |
| 2007/0044572 A1 | 3/2007 | Davis et al. |
| 2007/0157737 A1 | 7/2007 | Gysling et al. |
| 2007/0279235 A1 | 12/2007 | Davis et al. |
| 2010/0316964 A1 | 12/2010 | Racine et al. |

OTHER PUBLICATIONS

English Language Abstract for WO2008133051.

* cited by examiner

VELOCITY BASED METHOD FOR DETERMINING AIR-FUEL RATIO OF A FLUID FLOW

CROSS-REFERENCE TO RELATED PATENT APPLICATIONS

This application is a continuation of, and claims the benefit to, patent application Ser. No. 12/179,214, filed 24 Jul. 2008, which itself claims the benefit of U.S. Provisional Patent Application No. 60/961,721 filed Jul. 24, 2007, U.S. Provisional Patent Application No. 61/027,500 filed Feb. 11, 2008, and U.S. Provisional Patent Application No. 61/034,602 filed Mar. 7, 2008, all of which are incorporated by reference herein in their entirety.

BACKGROUND OF THE INVENTION

This invention provides a method to measure parameters of a fluid/particle mixture in a pipe that can be used in many applications, such as in chemical, pharmaceutical, petroleum and power generation. In particular, the invention provides a method to measure pulverized coal and air mixtures used in pulverized fuel delivery systems found within a large percentage of coal fired boilers used in the power generation industry.

Currently, well over 50% of the electricity in the U.S. is generated with coal. While coal is considered a cost effective, abundant resource in the U.S., the use of coal has been restricted due in large part to environmental concerns. To mitigate this impact, the U.S. Department of Energy and the power generation industry have large programs designed to develop technology to reduce the environment effects of burning coal. These Clean Coal Initiatives include technology designed to develop improvements in the combustion process to improve efficiency while reducing pollutants such as unburned carbon, ash, and nitrous oxide ($N_2O$).

The ability to measure the flow rate and composition of the air/coal mixture within the coal pipes is an important performance aspect of any particle fuel delivery system. The industry recognizes this and therefore has been developing a wide variety of technologies to perform these measurements. The technologies include probe devices and sampling devices, as well as real time meters based on a wide variety of technologies including electrostatic charges, microwaves, and ultrasonic. Many of these devices suffer from complexity, require substantial maintenance, impede flow, or are unreliable. A sensing device that is accurate, non-intrusive, and reliable would be highly advantageous.

SUMMARY OF THE INVENTION

According to the present invention, a method for determining one or more fluid flow parameters for a fluid flowing within a pipe is provided. The fluid comprises a mixture of solid particles and gas. The method comprises the steps of: a) providing a meter operable to determine the velocity of the fluid flow through the pipe, which meter is substantially insensitive to the particulate/gas mass ratio of the fluid flow; b) determining the velocity of the fluid flow within the pipe using the meter; and c) determining a particulate/gas mass ratio using a density value for the gas within the flow and the determined fluid flow velocity.

One of the advantages of the present invention method is that it provides a simple, non-intrusive method for determining the particulate/gas mass ratio of a fluid flow that is accurate regardless of the particulate loading within the fluid flow. The method determines the velocity of the fluid flow using sensors that are insensitive to the presence of particles within the fluid flow. The velocity, in turn, is used to determine the particulate/gas mass ratio, and can be used to determine the particulate mass flow rate and the gas mass flow rate. Consequently, accurate flow data is provided regardless of the particulate/gas mass ratio of the fluid flow.

Other advantages include the fact that the present method does not require external inputs. For example, in the context of a coal/air delivery system, the present invention does not require the input of the pulverizer feed rate. Because the parameters determined using the present invention method are independent of the pulverizer feed rate, the same parameters can be used to detect anomalies in the feed rate. Another advantage is that the method can be performed independent of upstream pipe geometry and control components. Consequently, the present method can be operated in a closed loop fashion. Still another advantage is that the method can be applied to a single pipe or a plurality of pipes within a system, as is diagrammatically depicted in FIG. 1

The foregoing features and advantages of the present invention will become more apparent in light of the following detailed description of exemplary embodiments thereof.

DETAILED DESCRIPTION OF THE INVENTION

Figure 1:
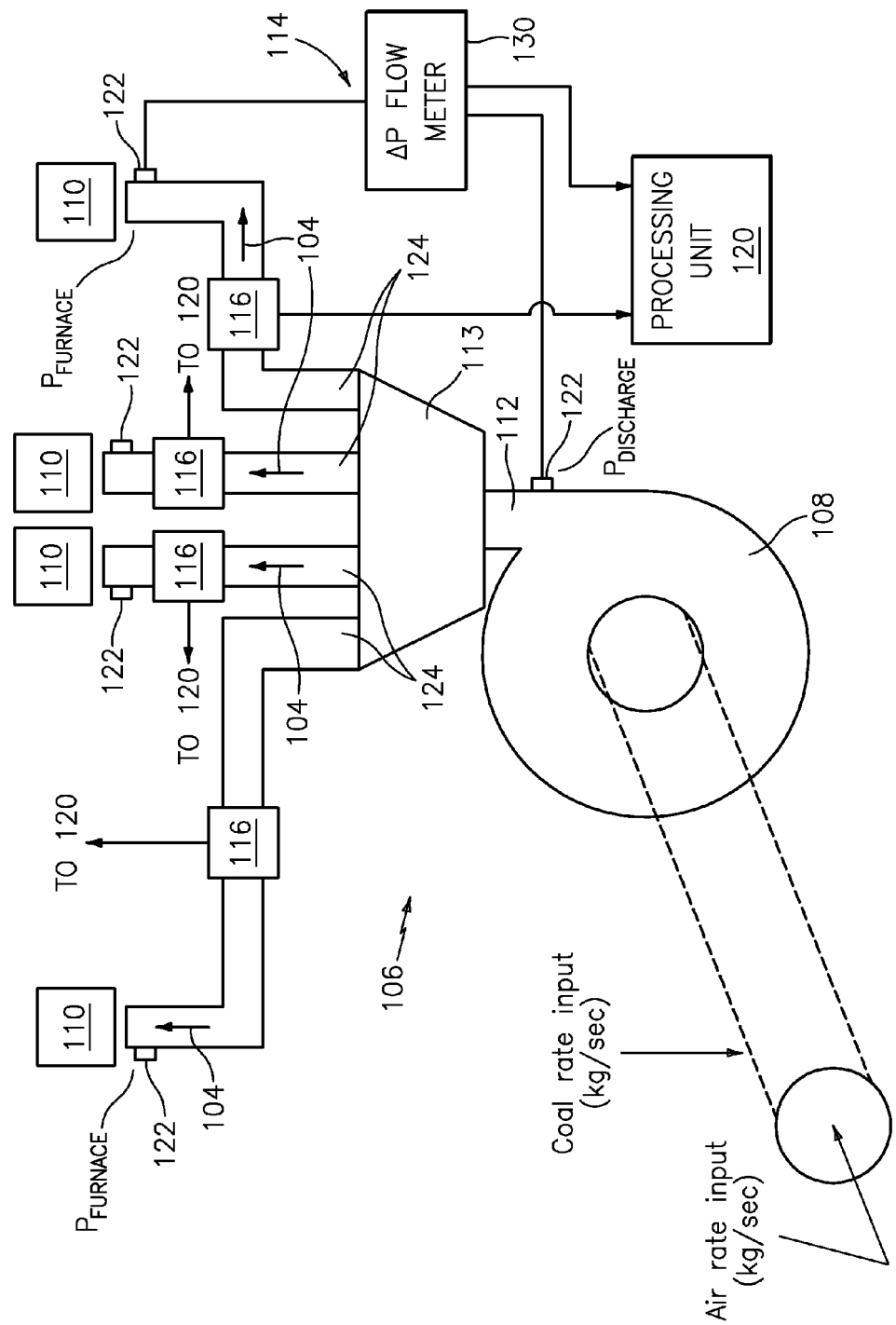
FIG. 1 is a schematic diagram of an embodiment of apparatus operable to practice the present invention method, which apparatus is applied to a diagrammatic piping system.

Referring to FIG. 1, a schematic diagram illustrates an embodiment of an apparatus operable to measure the particulate/gas mass ratio mass flow rates of a flow 104 within a pipe according to the present invention. The flow 104 within the pipe comprises a mixture of gas and suspended solid particles. In the example shown in FIG. 1, apparatus operable to perform the present invention method is applied to a piping system 106 for delivering a pulverized coal/air mixture 104 from a coal pulverizer 108 to a plurality of furnaces 110. This example is provided for illustrative purposes only. The present invention is not limited to this application or to a system that handles pulverized coal as the particulate matter within the fluid flow 104. Other industries that utilize particulate/gas delivery systems include chemical, pharmaceutical, and petroleum industries. In FIG. 1, the piping system 106 includes a discharge pipe 112 extending between the coal pulverizer 108 and a manifold 113. A plurality of furnace feed pipes 124 extend between the manifold 113 and a plurality of furnaces 110.

The apparatus includes an at least one flow meter 116 having an array of sensors 118 (sonar based flow meter; see FIG. 2), and may include at least one differential pressure meter 114 (DP meter). The DP meter 114 is sensitive to the particulate/gas mass ratio of the flow 104 and consequently reports a difference in pressure as a function of the particulate/gas mass ratio for a given flow velocity; i.e., the difference in pressure is proportional to the amount of particulate matter within the flow 104, keeping the flow velocity constant. In contrast, the sonar based flow meter 116 has been demonstrated to accurately report the velocity of a particulate/gas flow 104 with little sensitivity to the particulate/gas mass ratio. In terms of flow rates, the sonar based flow meter 116 and the DP meter 114 will report the same flow rates for a gas flow without suspending particulate matter, and will report diverging flow rates with increasing particulate mass within the particulate/gas flow 104. Thus, the DP meter 114 and sonar based flow meter 116 can be used together to measure parameters such as the particulate/gas mass ratio of the flow 104, the particulate mass flow rate, and the gas mass flow rate.

Each DP meter 114 is used to determine the difference in pressure within the flow 104 between at least two points in the pipe, or pipe system. In the system shown in FIG. 1, for example, each DP meter 114 is operable to determine the difference in pressure between the pulverizer discharge pipe 112 and the respective furnace feed pipes 124 (or furnace 110). In the system shown in FIG. 1, the DP meter 114 utilizes sensors 122 (e.g., pitot tubes) operable to determine the pressure of the particulate/gas flow 104 within the pipe at the location of the sensor 122 (or within the furnace 110). The DP meter 114 may also include a processor 130. In alternative embodiments (see description of FIG. 8 below), the DP meter 114 may be a flow obstruction or restriction type device (e.g., an orifice plate).

Figure 2:
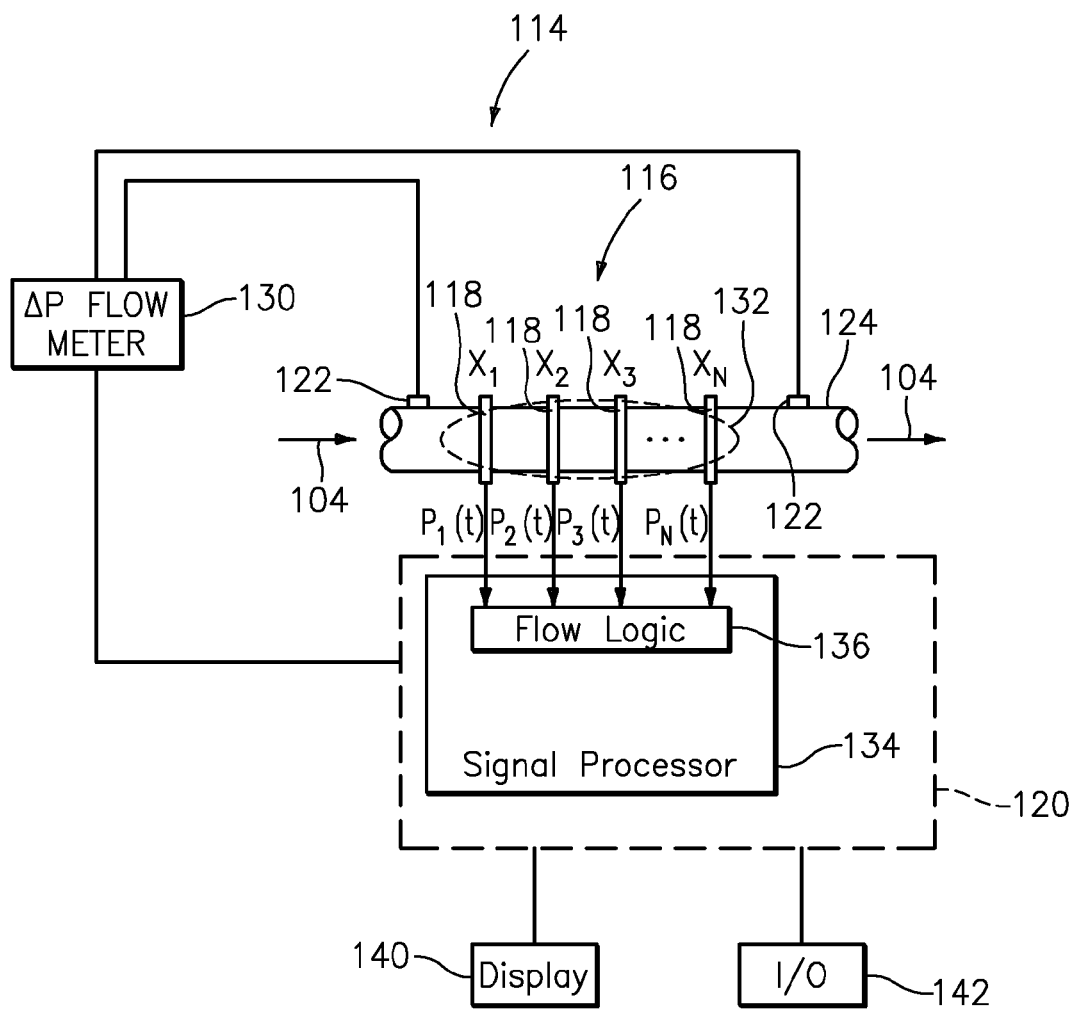
FIG. 2 is a schematic diagram of an embodiment of apparatus operable to practice the present invention method, including a sonar type flow meter having an array of sensors and a differential pressure meter.

Now referring to FIG. 2, each sonar based flow meter 116 is operable to determine the velocity of the particulate/gas flow 104 within the pipe 124 to which it is mounted. Each sonar based flow meter 116 includes a spatial array 132 of at least two pressure sensors 118 disposed at different axial locations $X_1 \ldots X_N$ along the respective pipe. Each of the pressure sensors 118 provides a pressure signal P(t) indicative of unsteady pressure within the pipe 124 at a corresponding axial location $X_1 \ldots X_N$ of the pipe 124. Each flow meter 116 may have a dedicated signal processor 134, or each may collectively utilize a common processing unit(s) 120. Each signal processor 134 (or common processing unit 120) receives the pressure signals $P_1(t) \ldots P_N(t)$ from the pressure sensors 118 in the array 132, and applies array-processing techniques to the pressure signals $P_1(t) \ldots P_N(t)$ to determine the velocity of the particulate/gas flow 104 according to a flow logic 136, which logic is described below in greater detail.

Although the sonar based flow meter 116 is diagrammatically shown in FIG. 2 with four pressure sensors 118, it is contemplated that the array 132 may include two or more pressure sensors 118, each providing a pressure signal P(t) indicative of unsteady pressure within the pipe 124 at a corresponding axial location X along the pipe 124. Generally, the accuracy of the measurement improves as the number of sensors 118 in the array 132 increases. The degree of accuracy provided by the greater number of sensors 118 is offset by the increase in complexity and time for computing the desired output parameter of the flow. Therefore, the number of sensors 118 used is dependent at least on the degree of accuracy desired and the desired update rate of the output parameter provided by the sonar based flow meter 116.

As indicated above, the signals $P_1(t) \ldots P_N(t)$ provided by the pressure sensors 118 of each array 132 may be processed by a signal processor 134 dedicated to that array, or may be processed collectively by a common processing unit 120. Each signal processor 134 may, for example, be a microprocessor and the processing unit 120 may be a personal computer or other general purpose computer. It is contemplated that the signal processors 134 may be analog or digital signal processing devices for executing programmed instructions, such as one or more microprocessors or application specific integrated circuits (ASICS), and may include memory for storing programmed instructions, set points, parameters, and for buffering or otherwise storing data. Further, it should be appreciated that some or all of the functions within the flow logic 136 may be implemented in software (using a microprocessor or computer) and/or firmware, or may be implemented using analog and/or digital hardware, having sufficient memory, interfaces, and capacity to perform the functions described herein.

The processing unit 120, in response to the flow velocity provided by the sonar based flow meter(s) 116 (and in some embodiments, the ΔP provided by the DP meter 114) is operable to determine flow parameters such as the particulate/air mass ratio, the mass flow rate of the gas portion, and the mass flow rate of the particulate portion of the particulate/gas flow within each pipe sensed, utilizing the flow logic 136. The processing unit 120 may output the determined flow parameter to a display 140, another input/output (I/O) device 142, or another processing device for further processing. Moreover, the I/O device 142 may also accept user input parameters as may be necessary for the flow logic 136. The I/O device 142, display 140, and/or signal processor 134 unit may be mounted in a common housing, which may be attached to the array 132 by a flexible cable, wireless connection, or the like.

It is also contemplated that signals from the DP meter 114 may be provided to the signal processor 134 of the respective sonar based flow meter 116, and the signal processor 134 may determine the desired parameters; e.g., particulate/gas mass ratio, the gas mass flow rate, and the particulate mass flow rate. Conversely, signals from the sonar based flow meter 116 may be provided to the signal processor 130 of the respective DP meter 114, and the signal processor 130 may determine the desired parameters (e.g., particulate/gas mass ratio, the gas mass flow rate, and the particulate mass flow rate).

In various embodiments of the present invention, a piezoelectronic pressure transducer may be used as one or more of the pressure sensors 118 and it may measure the unsteady (or dynamic or ac) pressure variations inside the pipe 124 by measuring the pressure levels inside the pipe 124. For example, the sensors 118 may comprise pressure sensors manufactured by PCB Piezotronics of Depew, N.Y. The pressure sensors may include integrated circuit piezoelectric voltage mode-type sensors that feature built-in microelectronic amplifiers, and convert the high-impedance charge into a low-impedance voltage output. Specifically, a Model 106B manufactured by PCB Piezotronics can be used, which sensor is a high sensitivity, acceleration compensated integrated circuit piezoelectric quartz pressure sensor suitable for measuring low pressure acoustic phenomena in hydraulic and pneumatic systems. It has the capability to measure small pressure changes of less than 0.001 psi under high static conditions. The 106B has a sensitivity of 300 mV/psi and a resolution of 91 dB (0.0001 psi). The sensors 118 may incorporate a built-in MOSFET microelectronic amplifier to convert the high-impedance charge output into a low-impedance voltage signal. The sensors 118 may be powered from a constant-current source and can operate over long coaxial or ribbon cable without signal degradation.

Acceptable piezoelectric sensors may include a piezoelectric material (e.g., polymer, polarized fluoropolymer—PVDF, co-polymer films, flexible PZR sensors, etc.) that measures strain induced within the process pipe 124 due to unsteady pressure variations within the flow 104. Strain within the pipe 124 is transduced to an output voltage or current by the attached piezoelectric sensors 118. The piezoelectric material may be adhered to the outer surface of a steel strap that extends around and clamps onto the outer surface of the pipe 124. The piezoelectric sensing element is typically conformal to allow complete or nearly complete circumferential measurement of induced strain. Advantages of sensing with piezoelectric films include non-intrusive flow rate measurements, low cost, no excitation source required, easily mountable in a variety of configurations to enhance signal detection schemes (e.g., co-located sensors, segmented sensors with opposing polarity configurations, wide sensors to enhance acoustic signal detection and minimize vortical noise detection, tailored sensor geometries to minimize sensitivity to pipe modes, and differencing of sensors to eliminate acoustic noise from vortical signals), and piezoelectric films can be constructed to be operable in higher temperature environments (e.g., 140 C).

The present invention contemplates that the above-described sonar based flow meter 116 may be substituted with an ultrasonic flow meter similar to any one of the following types of meters: Transit Time Ultrasonic Flow Meter (TTUF), Doppler Ultrasonic Flowmeter (DUF), and Cross Correlation Ultrasonic Flow Meter (CCUF), similar to that described in the article "Guidelines for the Use of Ultrasonic Non-Invasive Metering Techniques" by M. L. Sanderson and H. Yeung, published on Jul. 17, 2002, which is incorporated herein by reference. An acceptable CCUF is a GE Panametrics DigitalFlow™ CTF878 flowmeter, which has a pair of ultrasonic sensors that can be disposed axially along the pipe.

Figure 3:
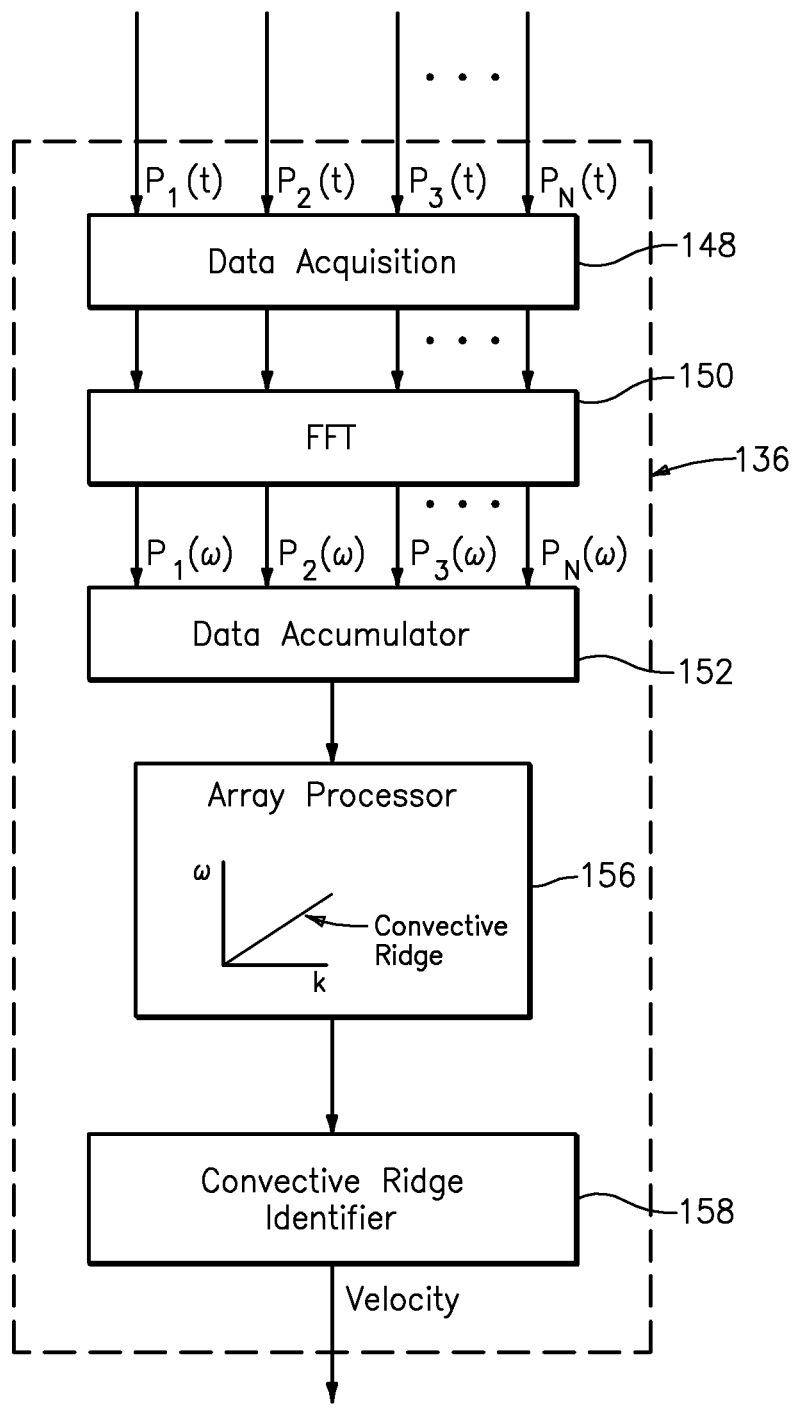
FIG. 3 is a block diagram of an embodiment of flow logic for the sonar based flow meter in the apparatus of FIG. 2.
Figure 4:
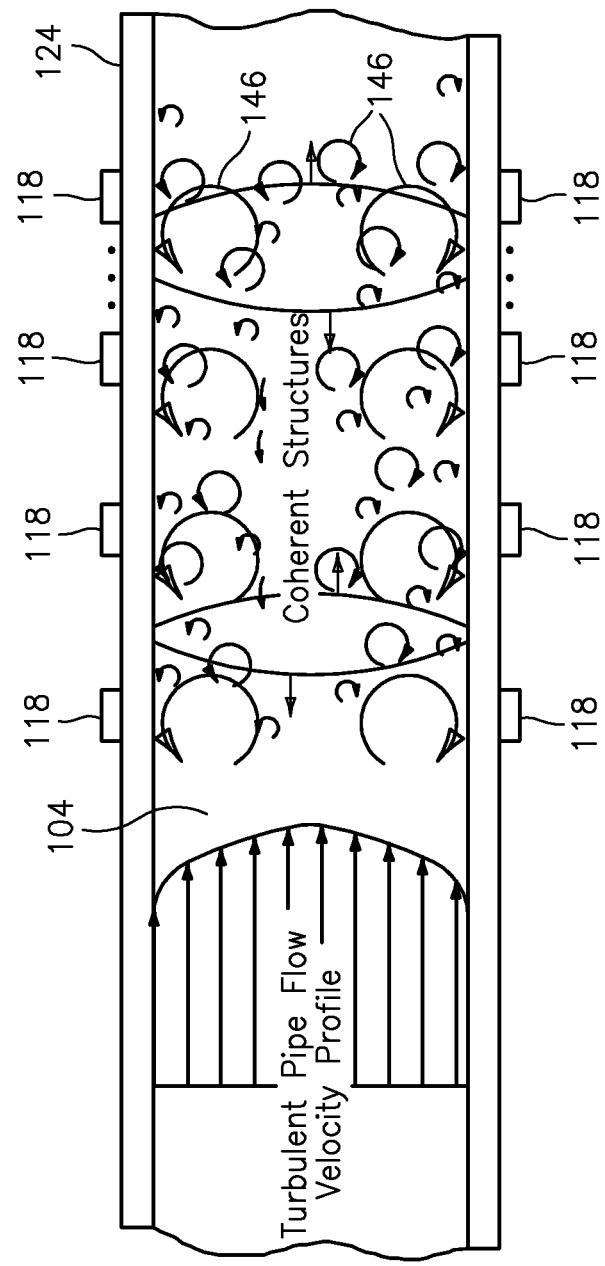
FIG. 4 is a cross-sectional view of a pipe having coherent structures therein.

Flow Logic—Velocity Processing:

Referring to FIGS. 2-5, an example of the flow logic 136 is diagrammatically shown in FIG. 3. As previously described, each flow meter 116 includes an array 132 of at least two sensors 118 located at locations $X_1, X_2 \ldots X_N$ disposed axially along the pipe 124. The sensors 118 sense respective stochastic signals propagating between the sensors 118 within the pipe 124 at their respective locations. Each sensor 118 provides a signal indicating an unsteady pressure at the location of each sensor 118, at each instant in a series of sampling instants. The pressure generated by the convective pressure disturbances (e.g., eddies 146, see FIG. 4) may be measured through the sensors 118, which may be strained-based sensors and/or pressure sensors. The sensors 118 provide analog pressure time-varying signals $P_1(t)$, $P_2(t)$, $P_3(t) \ldots P_N(t)$ to the signal processor 134, which in turn applies these signals $P_1(t), P_2(t), P_3(t) \ldots P_N(t)$ to the flow logic 136. The flow logic 136 processes the signals $P_1(t)$, $P_2(t), P_3(t) \ldots P_N(t)$ to first provide output signals (parameters) indicative of the pressure disturbances that convect with the particulate/gas flow 104, including output signals indicative of the velocity of the flow 104.

The signal processor 134 includes data acquisition unit 148 (e.g., A/D converter; see FIG. 3) that converts the analog signals $P_1(t) \ldots P_N(t)$ to respective digital signals and provides the digital signals $P_1(t) \ldots P_N(t)$ to FFT logic 150. The FFT logic 150 calculates the Fourier transform of the digitized time-based input signals $P_1(t)$. $P_N(t)$ and provides complex frequency domain (or frequency based) signals $P_1(\omega)$, $P_2(\omega), P_3(\omega), \ldots P_N(\omega)$ indicative of the frequency content of the input signals to a data accumulator 152. The flow logic 136 is not limited to using FFT's, and other techniques for obtaining the frequency domain characteristics of the signals $P_1(t) \ldots P_N(t)$, may be used alternatively. For example, the cross-spectral density and the power spectral density may be used to form frequency domain transfer functions (or frequency response or ratios). One technique of determining the convection velocity of the turbulent eddies 146 within the fluid 104 is by characterizing a convective ridge (154 in FIG. 5) of the resulting unsteady pressures using an array of sensors or other beam forming techniques, similar to those described in U.S. Pat. Nos. 6,889,562 and 6,609,069, which patents are incorporated herein by reference in their entireties.

Figure 5:
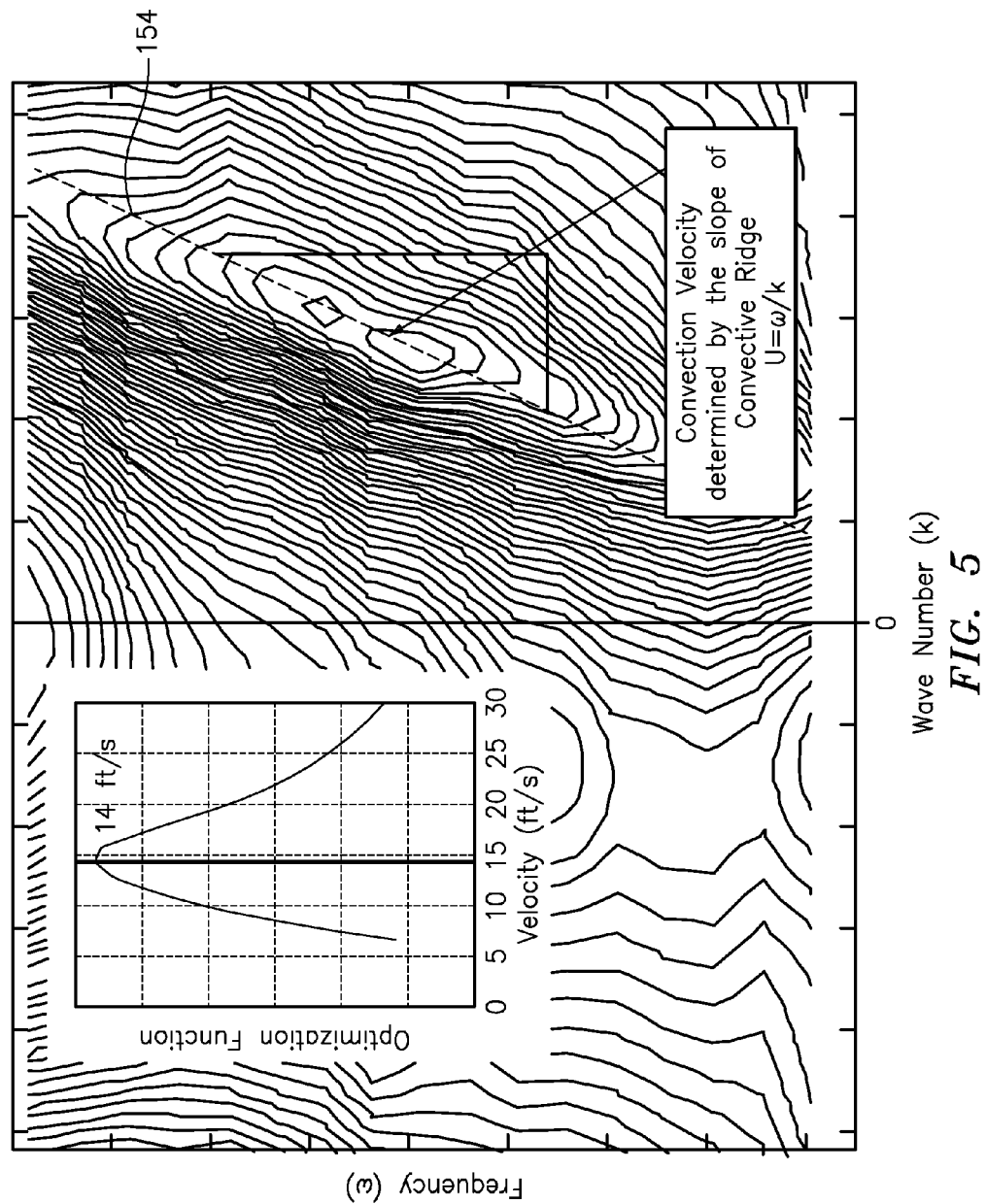
FIG. 5 is a k-ω plot of data processed from the apparatus of the present invention that illustrates the slope of the convective ridge, and a plot of the optimization function of the convective ridge in accordance with the present invention.

The data accumulator 152 accumulates the frequency signals $P_1(\omega) \ldots P_N(\omega)$ over a sampling interval, and provides the data to an array processor 156, which performs a spatial-temporal (two-dimensional) transform of the sensor data, from the xt domain to the k-ω domain, and then calculates the power in the k-ω domain, as represented by the k-ω plot shown in FIG. 5. The array processor 156 uses standard so-called beam forming, array processing, or adaptive array-processing algorithms; i.e., algorithms for processing the sensor signals using various delays and weighting to create suitable phase relationships between the signals provided by the different sensors, thereby creating phased antenna array functionality). In other words, the beam forming or array processing algorithms transform the time domain signals from the sensor array into their spatial and temporal frequency components i.e., into a set of wave numbers given by $k=2\pi/\lambda$, where λ is the wavelength of a spectral component, and corresponding angular frequencies given by $\omega=2_\pi v$.

It should be appreciated that the prior art teaches many algorithms for use in spatially and temporally decomposing a signal from a phased array of sensors, and the present invention is not restricted to any particular algorithm. Acceptable adaptive array processing algorithms include the Capon method/algorithm and the MUSIC algorithm. The present invention recognizes that such techniques can be used to determine flow velocity; i.e., that the signals caused by a stochastic parameter convecting with a flow are time stationary and have a coherence length long enough that it is practical to locate sensor units apart from each other and yet still be within the coherence length. Convective characteristics or parameters have a dispersion relationship that can be approximated by the straight-line equation, $k=\omega/\mu$ where μ is the convection velocity (flow velocity). A plot of k-ω pairs obtained from a spectral analysis of sensor samples associated with convective parameters portrayed so that the energy of the disturbance spectrally corresponding to pairings that might be described as a substantially straight ridge, a ridge that in turbulent boundary layer theory is called a convective ridge. What is being sensed is not a plurality of discrete events of turbulent eddies, but rather a continuum of possibly overlapping events forming a temporally stationary, essentially white process over the frequency range of interest. In other words, the convective eddies 146 are distributed over a range of length scales and hence temporal frequencies.

To calculate the power in the k-ω plane, as represented by a k-ω plot (see FIG. 5) of either one of the signals, the array processor 156 determines the wavelength and so the (spatial) wavenumber k, and also the (temporal) frequency and so the angular frequency ω, of various of the spectral components of the stochastic parameter. There are numerous algorithms available in the public domain to perform the spatial/temporal decomposition of arrays of sensors 118. The present invention may use temporal and spatial filtering to precondition the signals to effectively filter out the common mode characteristics ($P_{common}$) and other long wavelength (compared to the sensor spacing) characteristics in the pipe 124 by differencing adjacent sensors 118 and retaining a substantial portion of the stochastic parameter associated with the flow field and any other short wavelength (compared to the sensor spacing) low frequency stochastic parameters. When suitable turbulent eddies 146 (see FIG. 4) are present within the flow, the power in the k-ω plane shown in the k-ω plot of FIG. 5 shows a convective ridge 154. The convective ridge 154 represents the concentration of a stochastic parameter that convects with the flow and is a mathematical manifestation of the relationship between the spatial variations and temporal variations described above. Such a plot will indicate a tendency for k-ω pairs to appear more or less along a line 154 with some slope, the slope indicating the flow velocity.

Once the power in the k-ω plane is determined, a convective ridge identifier 158 uses one or another feature extraction method to determine the location and orientation (slope) of any convective ridge 154 present in the k-ω plane. In one embodiment, a so-called slant stacking method is used, a method in which the accumulated frequency of k-ω pairs in the k-ω plot along different rays emanating from the origin are compared, each different ray being associated with a different trial convection velocity. The velocity of the flow 104 can be determined from the slope of the rays.

In a piping system 106 such as that shown in FIG. 1, the present invention can be used to determine flow parameters such as the flow velocity within a pipe 124. Once the flow velocity is known, it can be used to determine the particulate/gas mass ratio, the particle mass flow rate, and the gas mass flow rate. The specific algorithm used to determine the aforesaid parameters can vary.

In a first embodiment, for example, the pressure loss through a section of pipe within the coal/air piping system 106 shown in FIG. 1 can be described as follows:

$$\Delta P = P_{discharge} - P_{furnace} = \beta_i \tfrac{1}{2} \rho_{air} V_i^2 (1 + CAR_i) \quad \text{(Eqn. 1)}$$

and the coal mass flow rate as follows:

$$\dot{m}_{coal} = \rho_{air} A_{pipe} \sum_{i=1}^{4} V_i \times CAR_i \quad \text{(Eqn. 2)}$$

where $P_{discharge}$ represents the pressure at the coal pulverizer discharge, $P_{furnace}$ represents the pressure at the furnace (either in the pipe 124 adjacent the furnace, or in the furnace 110), $\beta_i$ represents a pressure loss coefficient between the pulverizer discharge 112 and the furnace 110 for each respective furnace feed pipe, $\rho_{air}$ represents a known or determined value for the density of air, $V_i$ represents the velocity of the flow mixture through each respective furnace feed pipe, $CAR_i$ represents the coal/air ratio within each respective furnace feed pipe, $\dot{m}_{coal}$ is the coal mass flow rate, and $A_{pipe}$ is the cross-sectional area of the pipe 124.

A mean pressure loss coefficient can be defined using the following equation:

$$\beta_{mean} = \frac{1}{N} \sum_{i=1}^{N} \beta_i \quad \text{(Eqn. 3)}$$

An initial value for the mean pressure loss coefficient $\beta_{mean}$ can be calculated or estimated from actual data from the system. With the $V_i$ values determined using the sonar based flow meters, the pressure loss coefficient values $\beta_i$ can be determined using the following linear equation:

$$\begin{bmatrix} V_1^2(1+CAR_1) & V_2^2(1+CAR_2) & 0 & 0 \\ V_1^2(1+CAR_1) & 0 & V_3^2(1+CAR_3) & 0 \\ V_1^2(1+CAR_1) & 0 & 0 & V_4^2(1+CAR_4) \\ 1 & 1 & 1 & 1 \end{bmatrix} \quad \text{(Eqn. 4)}$$

$$\begin{Bmatrix} \beta_1 \\ \beta_2 \\ \beta_3 \\ \beta_4 \end{Bmatrix} = \begin{Bmatrix} 0 \\ 0 \\ 0 \\ N\beta_{mean} \end{Bmatrix}$$

The pressure loss coefficient $\beta_i$ values can be initially determined using known $CAR_i$ values (e.g., air only—CAR=0, or sensed CAR values). Once the pressure loss coefficient values have been determined, actual $CAR_i$ values can be determined using the following linear equation:

$$\begin{bmatrix} \beta_1 V_1^2 & -\beta_2 V_2^2 & 0 & 0 \\ \beta_1 V_1^2 & 0 & -\beta_3 V_3^2 & 0 \\ \beta_1 V_1^2 & 0 & 0 & -\beta_4 V_4^2 \\ V_1 & V_2 & V_3 & V_4 \end{bmatrix} \begin{Bmatrix} CAR_1 \\ CAR_2 \\ CAR_3 \\ CAR_4 \end{Bmatrix} = \quad \text{(Eqn. 5)}$$

$$\begin{Bmatrix} \beta_2 V_2^2 - \beta_1 V_1^2 \\ \beta_3 V_3^2 - \beta_1 V_1^2 \\ \beta_4 V_4^2 - \beta_1 V_1^2 \\ \dot{m}_{coal} / (\rho_{air} A_{pipe}) \end{Bmatrix}$$

The air mass flow rate $\dot{m}_{air}$ can then be determined using the following equation:

$$CAR = \frac{\dot{m}_{COAL}}{\dot{m}_{AIR}} \quad \text{(Eqn. 6)}$$

From the above it can be seen that after the initial calibration, a coal/air mass ratio value for each feed pipe 124 can be determined by determining the bulk velocity of the coal/air mixture 104 passing within the feed pipe 124 using a sonar based flow meter 116 such as that described above. The pressure loss coefficient for the path through each feed pipe 124 can be periodically determined to ensure the calibration of the system 106 is within acceptable standards.

Figure 6:
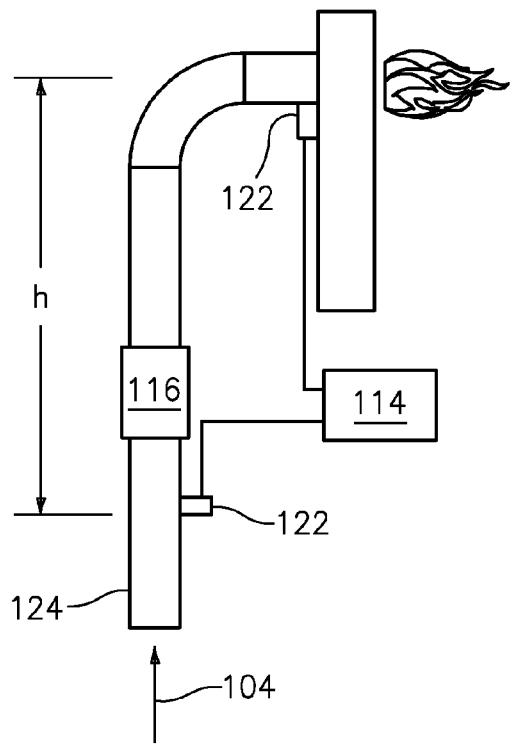
FIG. 6 is a diagram of apparatus operable to practice the present invention applied to a pipe section.

Now referring to FIGS. 1, 2, and 6, in a second embodiment the coal/air mass ratio, the coal mass flow rate, and the air mass flow rate (e.g., for a coal/air fuel system such as that shown in FIG. 1) can be determined using the output of the DP meter 114 (e.g., the difference in pressure between the pulverizer discharge pipe 112 and the furnace 110/respective feed pipe 124; $P_{discharge} - P_{furnace}$), and the output of the sonar based flow meters 116 (i.e., the velocity of the flow 104 within the respective feed pipe 124).

For a given piping system for a particulate/gas mixture, the pressure loss through a section of pipe may be described as a function of the elevation change (h), the bulk velocity of the flow mixture (u), the mixture density (ρ), and a pressure loss coefficient (K). The pressure loss can be expressed as follows:

$$\Delta P = \rho g h + K \tfrac{1}{2} \rho u^2 \quad \text{(Eqn. 7)}$$

where ΔP is the pressure loss and g is the gravitational constant. The diagram shown in FIG. 6 illustrates the present invention as applied to a particular pipe 124. In terms of the piping system 106 shown in FIG. 1 (including multiple feed pipes 124), the relationship expressed in Eqn. 7 may be used for each furnace feed pipe 124. The mixture density is the density of the particulate/gas mixture 104 flowing through the pipe 124. The density of the coal/air flow 104 may be described as follows:

$$\rho = \phi_{AIR}\rho_{AIR} + \phi_{COAL}\rho_{COAL} \quad \text{(Eqn. 8)}$$

where $\phi$ is the volume fraction of each component. In certain particulate/gas mixtures it can be shown that the volume fraction of the particulate component is much less than the volume fraction of the gas component (e.g., $\phi_{COAL} \ll \phi_{AIR}$), and therefore the following relationship can be used:

$$\rho = \rho_{AIR}(1 + \text{CAR}) \quad \text{(Eqn. 9)}.$$

where CAR may be defined as provided in Eqn. 6. Combining Eqns. 7 and 9, a CAR value for each feed pipe may be determined as follows:

$$CAR = \frac{\Delta P}{\rho_{AIR} g h + K \frac{1}{2} \rho_{AIR} u^2} - 1 \quad \text{(Eqn. 10)}$$

where K is a pressure loss coefficient.

Figure 7:
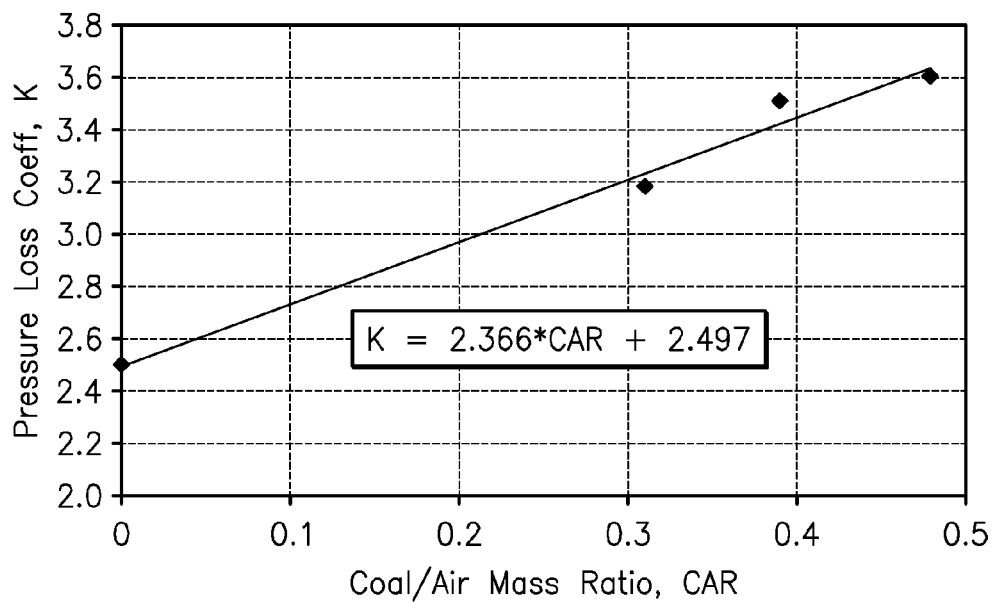
FIG. 7 is a plot of pressure loss coefficients versus coal/air mass ratios.

The pressure loss coefficient K may be determined through in situ calibration. If the flow 104 running through the pipe 124 contains only air, the pressure loss coefficient through the pipe will be a function of only the pipe geometry (e.g., the number of elbows, straight run length, wall roughness, etc.) For coal/air mixtures, the pressure loss coefficient K will also be dependent on the piping geometry, but may be a function of the coal/air ratio as well. It can be assumed that the pressure loss coefficient is linear with the coal/air ratio:

$$K = K_o + K_1 \cdot \text{CAR} \quad \text{(Eqn. 11)}$$

where $K_o$ is the pressure loss coefficient when only air flows through the system, and $K_1$ is a coefficient reflecting the dependence of the pressure loss coefficient on the coal/air ratio. The pressure loss coefficient relationship of Eqn. 11 is an example of how the coefficient may be determined, and the present invention is not limited to this expression. In some applications, for example, it may be preferable to utilize a higher order model for the pressure loss coefficient K. Calibration for each pipe 124 can be performed by using a flow 104 of a known coal/air ratio within a given feed pipe 124, measuring the ΔP and the velocity for that particular feed pipe, and solving Eqn. 10 for K. A pressure loss coefficient calibration curve (such as that shown in FIG. 7) can be created using two or more determined pressure loss coefficient values (e.g., one determined using air only and one or more at typical coal/air ratio settings), and the assumption that the pressure loss coefficient is linear with the coal/air ratio.

Once the CAR value for each feed pipe 124 is determined, the mass flow rates can be determined using the following relationships:

$$\dot{m}_{AIR} = \rho_{AIR} u A \quad \text{(Eqn. 12)}$$

$$\dot{m}_{COAL} = \dot{m}_{AIR} \cdot \text{CAR} \quad \text{(Eqn. 13)}$$

Figure 8:
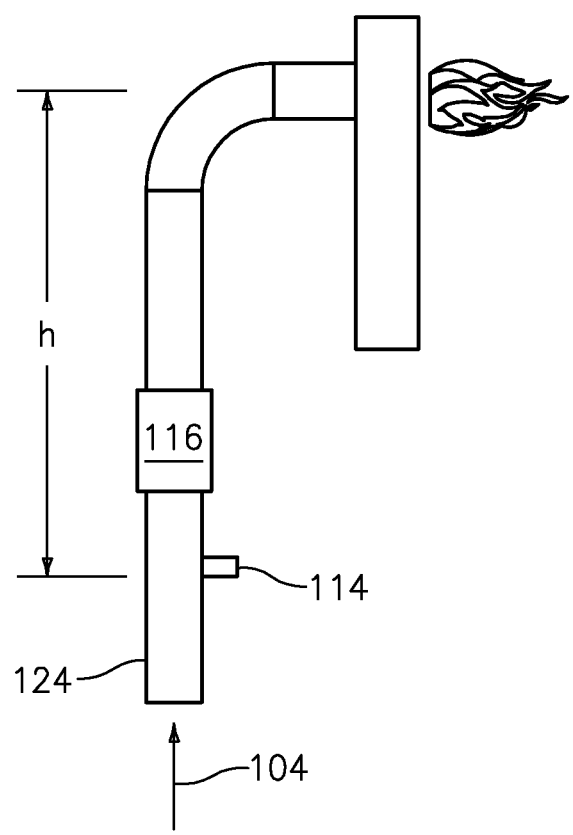
FIG. 8 is a diagram of apparatus operable to practice the present invention applied to a pipe section.

Now referring to FIGS. 1, 2, and 8, in a third embodiment of the present invention, parameters such as the coal/air mass ratio, the coal mass flow rate, and the air mass flow rate can be determined using the output of the DP meter 114 (e.g., a "dirty air" probe insertable into the flow and operable to measure both the static ($P_s$) and total ($P_t$) pressures of the flow, such as a pitot tube and the output of the sonar based flow meters 116 (i.e., the velocity of the flow 104 within each respective feed pipe 124).

For a particulate/gas mixture flowing through a given pipe length (e.g., one like that shown in FIG. 8), the conservation of energy provides that the pressure loss within the pipe 124 may be considered in terms of the dynamic pressure (q) of the flow 104, which equals the difference between the total and static pressures:

$$q = \tfrac{1}{2}\rho u^2 = P_t - P_s \quad \text{(Eqn. 14)}.$$

Eqn. 14 can be rearranged as follows:

$$u = \sqrt{\frac{2(P_t - P_s)}{\rho}}. \quad \text{(Eqn. 15)}$$

In a coal/air distribution application, the velocity of the coal/air flow 104 in the pipe 124 is determinable using a sonar based flow meter 116, and the dynamic pressure ($P_t - P_s$) is determinable using a DP meter 114. Using those values and Eqn. 15, the density ($\rho$) of the flow 104 can be determined.

As stated above, for those applications where the volume fraction of the particulate component is much less than the volume fraction of the gas component (e.g., $\phi_{COAL} \ll \phi_{AIR}$), the density of the flow may also be expressed as is disclosed in Eqn. 9. With the determined value of the flow density and a known value of the air density (at a given temperature), an initial value for the CAR for each feed pipe can be determined using Eqn. 9. Once the CAR value for each feed pipe is determined, the mass flow rates can be determined using Eqns. 12 and 13.

While the invention disclosed herein is discussed in terms of one or more DP meters 114 and one or more sonar meters 116, the present invention contemplates that any meter and/or combination of meters suitable to the desired end purpose may be used, such that the meters provide an output measurement having a repeatable over report function (or output signal) with respect to the particulate/gas mass ratio of the flow 104, wherein the over reporting is substantially less than the over reporting of the DP meter 114. The greater the difference in the over reporting between the meter and the DP meter 114, the greater the accuracy and resolution of the particulate/gas mass ratio measurement. Moreover, one should appreciate that the meters (e.g., sonar and/or ultrasonic) combined with the differential meter may also comprise non-invasive clamp on sensors or wetted sensors.

The method of the invention may be embodied in the form of a computer or controller implemented processes. The invention may also be embodied in the form of computer program code containing instructions embodied in tangible media, such as floppy diskettes, CD-ROMs, hard drives, and/or any other computer-readable medium, wherein when the computer program code is loaded into and executed by a computer or controller, the computer or controller becomes an apparatus for practicing the invention. The invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein when the computer program code is loaded into and executed by a computer or a controller, the computer or controller becomes an apparatus for practicing the invention. When implemented on a general-purpose microprocessor the computer program code segments may configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A signal processor for determining one or more fluid flow parameters for a fluid flow within a pipe, the fluid flow comprising a mixture of solid particles and gas, the signal processor comprising:
   at least one module configured to:
   receive signals indicative of unsteady pressure variations within the pipe, the signals being generated by a flow meter that is substantially insensitive to a particulate/gas mass ratio of the fluid flow;
   determine the velocity of the fluid flow based at least partly on the unsteady pressure variations sensed by the flow meter and contained in the signals; and
   determine a particulate/gas mass ratio of the fluid flow based at least partly on a density value for the gas within the fluid flow and the velocity determined for the fluid flow.

2. The signal processor of claim 1, wherein the signals are generated by a sonar based flow meter that includes a spatial array of at least two sensors, with each sensor in the array disposed at an axial position along the pipe different than the axial positions of the other sensor or sensors.

3. The signal processor of claim 1, wherein the signals contain information indicative of unsteady pressures generated by pressure disturbances convecting with the flow.

4. The signal processor of claim 3, wherein the at least one module is configured to determine a pressure loss coefficient for the pipe.

5. The signal processor of claim 4, wherein the at least one module is configured to determine the particulate/gas mass ratio of the flow based at least partly on the pressure loss coefficient.

6. The signal processor of claim 1, wherein the at least one module is configured to determine a pressure difference between two axial positions within the pipe, create a pressure difference value, and determine the particulate/gas mass ratio based at least partly on the pressure difference value.

7. The signal processor of claim 6, wherein the at least one module is configured to determine the mass flow rate of the gas within the flow based at least partly on the determined velocity of the flow, the density value of the gas, and a cross-sectional area of the pipe.

8. The signal processor of claim 7, wherein the at least one module is configured to determine the mass flow rate of the particulates within the flow based at least partly on the determined particulate/gas mass ratio and the gas mass flow rate.

9. The signal processor of claim 6, wherein the at least one module is configured to determine a pressure loss coefficient for the pipe.

10. The signal processor of claim 9, wherein the pressure loss coefficient includes a component having a value that varies with the particulate/gas mass ratio of the flow.

11. The signal processor of claim 10, wherein the at least one module is configured to determine the particulate/gas mass ratio based at least partly on the pressure loss coefficient determined.

12. The signal processor of claim 1, wherein the at least one module is configured to determine a static pressure value of the flow and a total pressure value of the flow, determine a density value of the flow using the static pressure value and the total pressure value, and determine the particulate/gas mass ratio based at least partly on the density value of the flow.

13. The signal processor of claim 12, wherein the at least one module is configured to determine the mass flow rate of the gas based at least partly on the determined velocity of the flow, the density value of the gas, and a cross-sectional area of the pipe.

14. The signal processor of claim 13, wherein the at least one module is configured to determine the mass flow rate of the particulates within the flow based at least partly on the determined particulate/gas mass ratio and the gas mass flow rate.

15. The signal processor of claim 1, wherein the at least one module is configured to provide signaling containing information about the particulate/gas mass ratio of the fluid flow.

* * * * *